B. M. W. HANSON.
LATHE.
APPLICATION FILED JUNE 8, 1916.
1,237,511.
Patented Aug. 21, 1917.
2 SHEETS—SHEET 1.
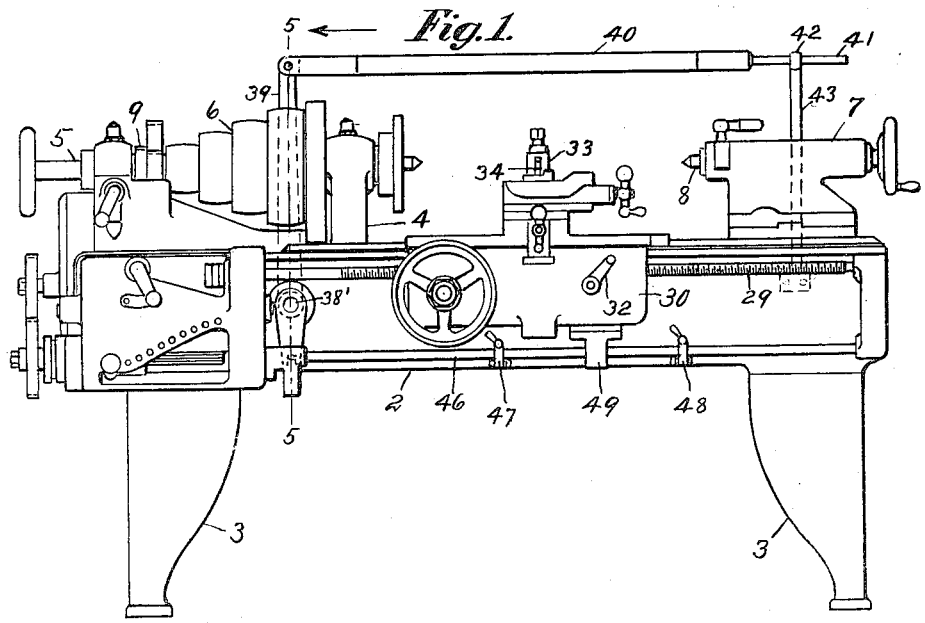
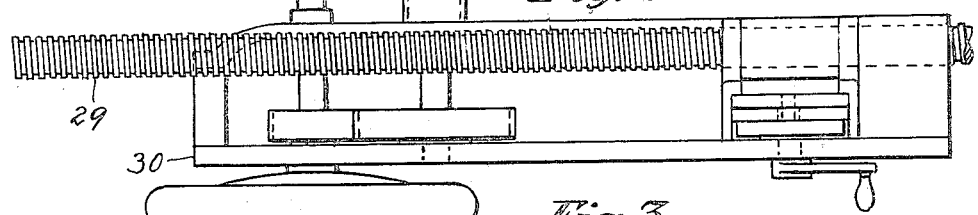
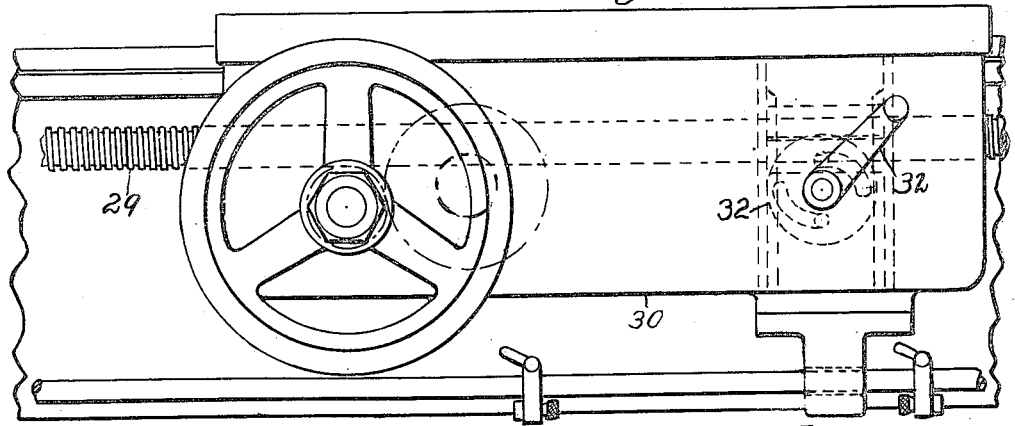

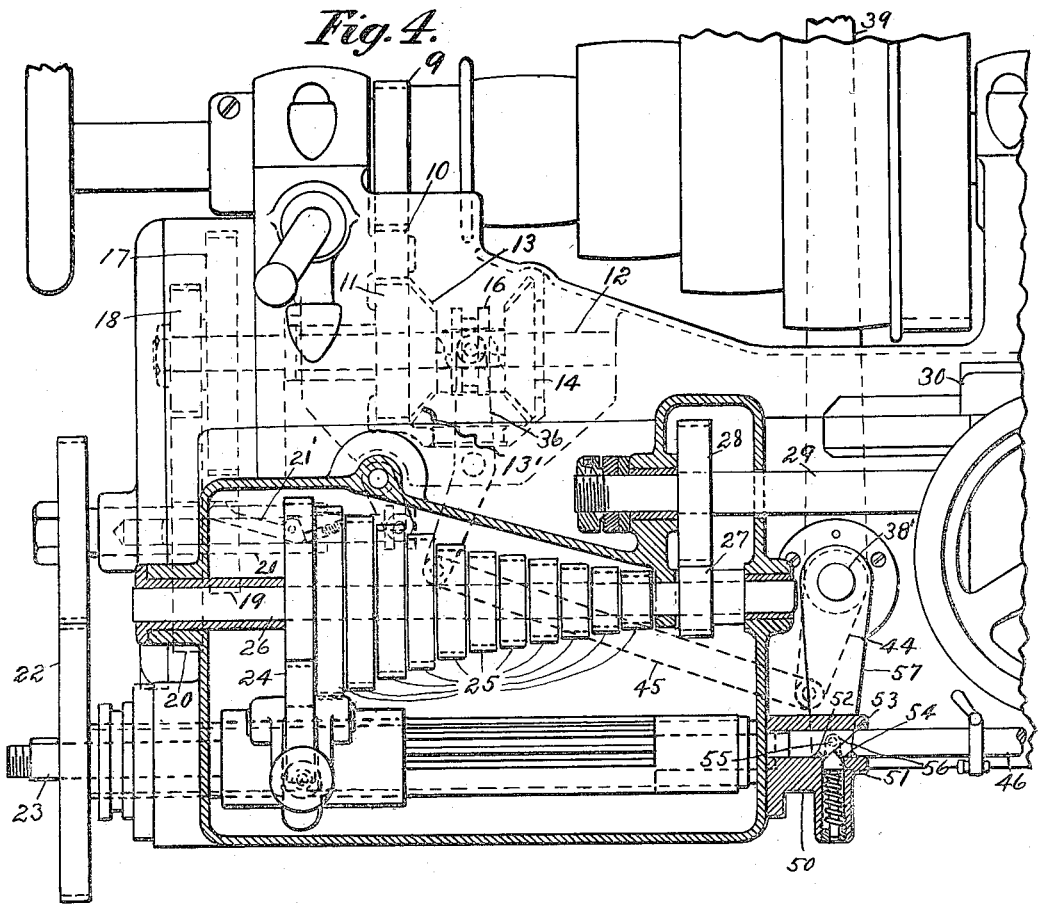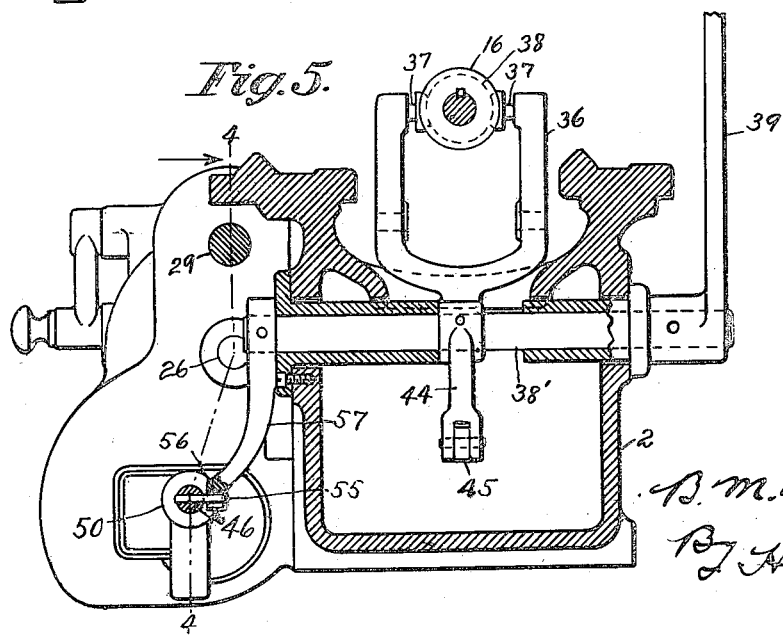

UNITED STATES PATENT OFFICE.

BENGT M. W. HANSON, OF HARTFORD, CONNECTICUT.

LATHE.

1,237,511.  Specification of Letters Patent.  Patented Aug. 21, 1917.

Application filed June 8, 1916. Serial No. 102,457.

*To all whom it may concern:*

Be it known that I, BENGT M. W. HANSON, a citizen of the United States, residing at Hartford, in the county of Hartford and State of Connecticut, have invented certain new and useful Improvements in Lathes, of which the following is a specification.

This invention relates to what I shall for convenience term a "lathe." I say for convenience, as the invention can be incorporated with advantage in other kinds of metal-working machines. One of the primary purposes of the invention is the provision of means of a simple and especially convenient character by which the carriage can be reversed. Another object is the provision of means of an effective kind by which the feed of the carriage can be automatically stopped when the carriage has completed a predetermined amount of movement in either direction.

In the drawings accompanying and forming part of the present specification I have shown in detail one convenient form of embodiment of the invention which will be fully set forth in the following description. I do not, however, restrict myself to this particular disclosure; I may depart therefrom in several respects within the scope of the invention defined by the claims following said description.

Referring to said drawings:

Figure 1 is a front elevation of a lathe involving the invention.

Fig. 2 is a top plan view of the lead screw and front portion of the carriage.

Fig. 3 is a front elevation of a part of the bed, lead screw and carriage and certain parts on the carriage.

Fig. 4 is a vertical section on the line 4—4 of Fig. 5, looking in the direction of the arrow.

Fig. 5 is a transverse section on the line 5—5 of Fig. 1, looking in the direction of the arrow.

Like characters refer to like parts throughout the several views which are on different scales.

The different parts of the machine may be supported in any desirable manner, for example by the base or bed 2 provided with pendent legs 3 as common in lathes and other styles of metal working machines. The head stock is denoted by 4 and it carries the main or live spindle 5 which can be driven in any convenient manner as by the cone pulley 6. The tail stock is designated by 7 and the tail spindle by 8, the work being supported between centers on the two spindles 5 and 8 as well understood. Rotative with the spindle 5 is a spur gear 9 in mesh with the idler 10 rotatively supported by a suitable bearing on the head stock 4. The pinion 10 in turn is in mesh with the spur gear 11 loose on the shaft 12 supported by bearings on the head stock. Rigid (for instance by being made integral) with the spur gear 11, is the bevel gear 13 in mesh with the bevel gear 13' carried by a bearing on the head stock 4 and in mesh with the bevel gear 14 also loose on the shaft 12, the two bevel gears 13 and 14 facing oppositely. Between said bevel gears 13 and 14 is a clutch member 16 splined or otherwise suitably associated with said shaft 12 for rotation therewith. The clutch member 16 is shown as occupying its neutral position in Fig. 4. It will be assumed that it is connected with the bevel gear 13. In this event the shaft 12 will be rotated forward. By clutching the bevel gear 15 to said shaft 12 through the agency of the clutch member 16, the shaft 12 will be reversed and it is from this shaft 12 in the present instance that the carriage hereinafter described is adapted to be fed either forward or backwardly. Fastened to the outer end of the shaft 12 are the spur gears 17 and 18 in mesh respectively with the spur gears 19 and 20 loose on the shaft 21 and adapted to be alternately clutched thereto by a clutch device as 21 as common. The shaft 21 is connected by change gearing denoted in a general way by 22 with the shaft 23. Associated with the shaft 23 is a gear 24 adapted to be connected at will with any one of the different size gears 25 on the shaft 26. This shaft 26 is provided with the pinion 27 in mesh with the spur gear 28 fastened to the lead screw 29 which extends through the carriage 30 (made as illustrated in the form of a slide), the base or bed 2 having ways to receive said slide 30 for forward and backward movements. It will be assumed that the gear 24 is in mesh with one of the gears 25, that the spindle 5 is being rotated and that the clutch member 16 is in engagement with the bevel gear 13. As a result the lead screw 29 will be rotated to advance the slide 30 or move it toward the left in Fig. 1 for thread cutting provided the half nuts 31 carried by the slide are in clamping engagement with the lead screw. The half nuts 31 are adapted to be closed onto or freed from the threads of the lead screw by the hand lever 32. Should the half nuts 31 be in engagement with the lead screw and should the clutch member 16 be in engagement with the bevel gear 14, the carriage or slide 30 will be retracted provided the spindle 5 is rotating. The foregoing is a familiar construction in screw-cutting lathes and is one way of obtaining the forward and backward movement of a carriage or slide as 30. This carriage is provided with a tool post as 33 equipped with a tool as 34 to thread the work held between the centers of the spindles 5 and 8, the work (not shown) being rotated in the way common in lathes.

The base or bed near the head end thereof supports the rocker 36, the upper part of the rocker being in the form of a fork and the branches thereof having inwardly extending pins or studs 37 to enter a peripheral channel 38 in the clutch member 16. Said base or bed 2 also supports for rocking movement the shaft 38'. To the rear end of this shaft is fastened the lever or arm 39 to the upper end of which is pivoted the elongated rod or bar 40. This bar it will be noticed is above and back of the bed; it has at its free end the reduced extension 41 fitting the eye 42 in the upper end of the post or standard 43 fastened to and rising from the bed 2 near the tail end thereof. Fastened to the shaft 38' between the ends thereof and depending therefrom is the arm 44, the rod or link 45 being pivoted to the lower end of said arm and being likewise jointed to the lower branch of the rocker or clutch member shifting device or actuator 36. It will be assumed that the parts are in neutral positions as shown for instance in Figs. 1 and 4 and that the spindle 5 is being rotated. It will also be supposed that the carriage or slide 30 is further to the right in Fig. 1. To advance the carriage to the left the lever 39 will be swung to the left in Fig. 1, thereby through the intermediate parts causing the clutch member 16 to engage the bevel gear 13 and through the intervening parts advance the carriage or slide. The feed of the carriage or slide can be stopped by moving the lever 39 to neutral position and the lever in turn through the described connections will also move the clutch member 16 to neutral position. By moving the lever 39 to the right in Fig. 1 from its neutral position, the clutch member 16 through the described parts will be caused to engage the bevel gear 14 whereby backward or retractive movement of the carriage through the described connections will be caused. The rod constitutes a convenient means for actuating the lever 39, being moved longitudinally for such purpose to effect through the agency of said lever either the forward or backward movement of the carriage 30 or stoppage in movement thereof. This manually operable member or rod is above the bed and can be easily reached by the attendant of the machine without stooping or assuming an unnatural or strained position.

Extending longitudinally of the bed 2 and supported by suitable bearings thereon for longitudinal sliding movement thereof is the controlling member 46 shown as a rod. Said controlling member has on it the dogs 47 and 48 longitudinally adjustable and adapted to be alternately engaged by the operating member 49 depending from the apron of the carriage 30. This operating member is shown as sleeved on the rod 46. When the carriage reaches a predetermined advance position it engages the dog 47 and on the further motion of the carriage moves the dog and therefore the rod 46 to the left. On the retractive movement the operating device 49 will engage the dog 48 and on the final part of the retractive movement will move the dog 48 and thus the rod 46. This rod 46 in the present case through suitable connections hereinafter described, is adapted to move the clutch member 16 to neutral position where as will be clear it is out of engagement with both bevel gears 13 and 15 to thus effect stoppage of the carriage. The head end of the rod 46 is slidable in a bearing 50 provided with a detent in the form of a spring plunger 51, the bevel head of which is coöperative with the notches 52, 53 and 54 in said rod, the head of the plunger 51 being shown as occupying the neutral or central notch 53 in Fig. 4, thus holding the clutch member 16 in neutral position as will hereinafter appear. The rod 46 is shown furnished with a lateral stud or pin 55 fitting a notch 56 in the lower edge of the arm 57 fastened to and depending from the rock shaft 38'.

It will be assumed that the clutch member 16 is in engagement with the bevel gear 13, and as a consequence that the carriage 30 is being advanced and that the head of the detent 51 is in the notch 52. When the carriage has almost reached the limit of its advance movement, the operating device 49 will strike the dog 47 and through said dog carry the rod 46 with the carriage, thus causing the plunger 51 to be withdrawn from the notch 52 and to enter the neutral notch 53 as shown in Fig. 4, this particular action occurring just as the carriage finishes its advance movement. As the rod 46 is moved forward or toward the left, it imparts a corresponding movement to the arm 57 and thus through the described parts causes the clutch member 16 to be disengaged from the bevel gear 13 and to be moved to its neutral position thereby to automatically stop the movement of the carriage. To reverse the carrier, therefore, it is necessary that the clutch member 16 be thrown into engagement with the bevel gear 14 through the action of the hand lever 39 or the connected rod 40 in the manner already described. It will be clear that when the clutch member is moved to neutral position through the agency of the hand lever or by the rod 40, the rod 46 through the described connections is also moved to neutral to cause the detent 51 to engage the neutral notch 53. When the clutch member 16 engages the bevel gear 14 to impart a back feed to the carriage 30, the rod 46 is further moved to the left through said connections to bring the notch 54 opposite the plunger 51, the plunger being shot into said notch by the power of its spring. It will be supposed that the carriage 30 is being fed backward. When it has nearly reached its extreme position the dog 48 will be engaged by the operating device to move the rod to the right and through the described parts cause the clutch member 16 to be moved to neutral to stop the movement of the carriage and to also cause the plunger 51 to enter the neutral notch 53, this condition occurring at the time the carriage has completed its back movement.

What I claim is:

1. In a machine of the class described a bed, a carriage slidable on said bed, a spindle rotative on said bed, mechanism for effecting the movement of the carriage including movement-controlling means active to effect forward or backward movement of the same, manually operable means associated with the movement controlling means to effect at will through said movement-controlling means, the movement of the carriage either forwardly or backwardly, and means operated by the carriage for operating the movement-controlling means to effect stoppage of the carriage when it has made a predetermined movement.

2. In a machine of the class described, a bed, a carriage slidable on said bed, a spindle rotative on said bed, mechanism for effecting the movement of the carriage including movement controlling means active to effect either forward or backward movement of the carriage and also stoppage of the same, a manually operable device extending in the direction of the line of movement of the carriage and above the bed, operatively connected with the movement controlling means to effect at will through said movement controlling means the movement of the carriage either forwardly or backwardly, and means operated by the carriage for operating the movement controlling means to effect the stoppage of the carriage when it has made a predetermined movement.

3. In a machine of the class described, a bed, a carriage slidable on said bed, a spindle rotative on said bed, mechanism for effecting the movement of the carriage including movement controlling means active to effect forward or backward movement or stoppage of the carriage, manually operable means for effecting the action of the movement controlling means to secure either forward or backward movement of the carriage, and means operated by the carriage when it has practically reached its respective movements for acting upon the movement controlling means to stop the movement of the carriage.

4. In a machine of the class described, a bed, a carriage slidable on said bed, means for effecting forward and backward movement of the carriage including oppositely rotative bevel gears, a clutch member between said bevel gears, a shifting device for the clutch member, a rock shaft extending transversely of the bed, a lever connected to said rock shaft, an arm connected to the rock shaft, a link between the arm and the clutch member shifting device, and a rod pivoted to the lever extending in the direction of the line of movement of the carriage and above the bed, and a post rising from the bed at a point removed from the lever and slidingly supporting the rod near its free end.

5. In a machine of the class described, a bed, a carriage slidable on said bed, means for effecting forward and backward movement of the carriage, including a pair of oppositely rotative bevel gears, a clutch member between the bevel gears, a hand lever supported by the bed and operatively connected with the clutch member to move the same alternately into engagement with the bevel gears to effect opposite movements of the carriage in alternation or out of engagement with both bevel gears to stop the movement of the carriage, a rod pivoted to the lever and extending in the direction of the line of movement of the carriage, and a rod extending longitudinally of the bed and provided with dogs to be engaged by the carriage when practically at the ends of its respective movements to effect in alternation opposite movements of the rod, and means actuated by said rod for moving the clutch member to neutral position out of engagement with both gears when the carriage reaches the ends of its respective movements.

6. In a machine of the class described, a bed, a carriage slidable on said bed, means for effecting forward and backward movement of the carriage, including a pair of oppositely rotative bevel gears, a clutch member between the bevel gears, a hand lever supported by the bed and operatively connected with the clutch member to move the same alternately into engagement with the bevel gears to effect opposite movements of the carriage in alternation or out of engagement with both bevel gears to stop the movement of the carriage, a rod pivoted to the lever and extending in the direction of the line of movement of the carriage, and a rod extending longitudinally of the bed and provided with dogs to be engaged by the carriage when practically at the ends of its respective movements to effect in alternation opposite movements of the rod, means actuated by said rod for moving the clutch member to neutral position out of engagement with both gears when the carriage reaches the ends of its respective movements, and a detent for engaging the rod when the clutch member is in neutral position.

7. In a machine of the class described, a bed, a carriage slidable on the bed, means including oppositely rotative bevel gears for effecting forward and backward movement of the carriage, a clutch member between the bevel gears, a clutch shifting device, a rock shaft on the bed provided with a pendent arm, a link between the pendent arm and the clutch shifting device, a lever fastened to the rock shaft and rising therefrom, an elongated rod above the bed extending in the direction of the line of movement of the carriage and pivoted to said lever, a post rising from the bed and slidably supporting the free end of the rod, an endwise movable rod extending longitudinally of the bed and provided with dogs to be operated by the carriage when the latter is practically at the ends of its opposite movements, an arm depending from said shaft and actuated by said last mentioned rod, and detent means engaging said last mentioned rod.

In testimony whereof I affix my signature in presence of two witnesses.

BENGT M. W. HANSON.

Witnesses:
W. M. STORRS,
H. E. BAILEY.